| United States Patent [19]
Mizuhara

[11] Patent Number: 4,919,730
[45] Date of Patent: Apr. 24, 1990

[54] BRAZING PASTE

[75] Inventor: Howard Mizuhara, Hillsborough, Calif.

[73] Assignee: GTE Products Corporation, Stamford, Conn.

[21] Appl. No.: 382,923

[22] Filed: Jul. 21, 1989

[51] Int. Cl.$^5$ .............................................. B23K 35/34
[52] U.S. Cl. ......................................... 148/24; 148/25
[58] Field of Search .................................... 148/24, 25

[56] References Cited

U.S. PATENT DOCUMENTS

| 2,631,952 | 3/1953 | Williams | 148/24 |
| 3,149,007 | 9/1964 | Chamer | 148/24 |
| 3,309,239 | 3/1967 | Harris | 148/24 |
| 4,273,593 | 6/1981 | Mastrangelo | 148/25 |

Primary Examiner—Peter D. Rosenberg
Attorney, Agent, or Firm—James Theodosopoulos

[57] ABSTRACT

A brazing paste consists of a liquid vehicle containing finely dispersed brazing alloy powder therein. The liquid vehicle consists of hydroxylpropylcellulose and 1,2-propanediol.

8 Claims, No Drawings

BRAZING PASTE

This invention concerns brazing pastes. Such pastes comprise a suspension of finely powdered brazing metal dispersed in a suitable liquid vehicle. The paste is applied to parts to be brazed, which are then raised to brazing temperature to effect brazing. Examples of such brazing pastes are disclosed in U.S. Pat. Nos. 3,073,270, 3,589,952, 4,273,593, 4,431,465 and 4,475,959. The pastes disclosed therein are applied by extrusion or hand trowelling.

This invention is concerned with a brazing paste that can be applied by screening. A screened layer of brazing paste is more uniform than, say, an extruded layer and the thickness thereof can be more accurately controlled.

The paste is applied to a flat surface through a screen, for example, a stainless steel 105 mesh screen. The screen is disposed a predetermined distance, called the springback distance, above the surface to be coated, say, about 40 mils. Brazing paste is disposed on the screen and a squeegee, held at an angle, is drawn across the screen to force the paste through the mesh onto the surface to be coated. The paste must have good leveling properties to fill in the gaps caused by the wires of the screen. Also, the liquid vehicle used in the paste must not readily evaporate at room temperature, to prevent the screen from drying up.

A vehicle for a brazing paste in accordance with this invention comprises hydroxylpropylcellulose (HPC) and 1,2-propanediol. Wetting agents and/or dispersing agents may also be included. The viscosity of the vehicle, the amount of pigment loading and the dried film hardness can be adjusted by the molecular weight of the HPC used. The HPC decomposes during heating at about 400° C., which leaves very little carbonaceous residue and therefore meets the requirement for vacuum brazing filler alloy.

An advantage of this vehicle is that after screening air bubbles will rise to the surface, burst and level, thereby preventing formation of pin holes.

In the following examples, all compositions are in weight percent.

EXAMPLE 1

A screening vehicle was made to the following composition: 98.65% 1,2-propanediol; 1.35% Klucel H. Klucel H is an HPC sold by Aqualon Co., Wilmington, Del. having a typical molecular weight of 1,150,000. The Klucel H and propanediol were mixed well for six hours using a motor driven stirrer. A brazing paste was prepared by mixing 10% of the screening vehicle with 90% of minus 325 mesh brazing alloy powder having the following composition: 62 Ag; 35 Cu; 2 Ti; 1 Sn. Using a 105 mesh screen and a springback distance of 40 mils, the paste was screened onto an alumina substrate measuring 1 ¼" by 1 ¼" by 0.13." The substrate was dried at 60° C. for one hour and then brazed at 830° C. under $10^{-5}$ torr vacuum. An excellent, bright, pin hole free alloy, 2 mils thick, resulted. Three Kovar strips, each 0.25" wide by 3" long by 10 mils thick, were placed over the brazing alloy coated substrate and brazed. Kovar is a FeNiCo alloy made by Westinghouse Corporation. The strips were then peel tested on Instron Tensile Test equipment, resulting in a peel pull of 18 to 20 pounds. This pull is equivalent to that obtained when a brazing foil of similar alloy composition is used on alumina that has been metallized with moly-manganese metallization. ASTM Tensile Test pieces (ASTM F-19-61 Tensile Test) were also coated on the brazing faces, assembled and brazed to the same schedules. The joints tested at $10^{-9}$ cubic centimeter per second leak rate to helium gas; this leak rate is acceptable for the vacuum tube industry.

EXAMPLE 2

A screening vehicle consisting of 1.25 Klucel H, 98.75 1,2-propanediol was prepared and mixed, in a 10 to 90 ratio, with a minus 325 mesh brazing alloy powder consisting of 59 Ag, 27 Cu, 12.5 In, 1.5 Ti. The paste was screened through a 105 mesh screen onto a 1¼" by 1¼" by 0.13" alumina substrate and dried. Kovar strips were placed on the screened layer and brazed at 740° C. under $10^{-5}$ torr vacuum. The resulting peel pull strength of 25 to 30 pounds is an excellent strength for this system.

EXAMPLE 3

A lower molecular weight HPC, Klucel E (MW 80,000), was used to prepare a thinner screening vehicle: 2% Klucel E; 98% 1,2-propanediol. A paste was prepared by thoroughly mixing 24% of this vehicle, 0.1% Triton X-100 and 75.9% of moly-manganese paint pigment #538. Triton X-100 is a wetting agent made by Rohm & Haas. The moly-manganese paint pigment #538 is made by the Wesgo division of GTE Products Corporation. Using a 145 mesh screen, the paste was screened onto an alumina substrate. The coated substrate was fired at 1500° C. in an atmosphere of 75 volume percent hydrogen, 25 volume percent nitrogen with a dew point of 30° C. The sintered molybdenum layer was 1.4 mils thick, free of pin holes. The coated substrate was then nickel plated, 0.1 mil thick, and then brazed to Kovar strips using 2 mil thick brazing foil of 72 Ag, 28 Cu. The resulting peel strength averaged 19 pounds, which is an excellent strength and comparable to the directly brazed system of Example 1.

EXAMPLE 4

A screening vehicle consisting of 3% Klucel G (MW 370,000) and 97% 1,2-propanediol was prepared by mechanically stirring for four hours at 50° C., producing a clear thick vehicle. A paste was prepared consisting of 11% of this vehicle and 89% of minus 325 mesh brazing alloy powder consisting of 92 Cu, 2.5 Si, 2.5 Sn, 3 Ti. The paste was screened onto an alumina substrate through a 105 mesh screen, and another alumina part was placed on top of the applied paste. The assembly was oven dried at 70° C. for one hour and then brazed at 1020° C. under $10^{-5}$ torr vacuum. An excellent brazed joint resulted.

I claim:

1. A screening paste comprising a liquid vehicle containing finely dispersed metal powder, the vehicle consisting essentially of hydroxylpropylcellulose and 1,2-propanediol, the paste having leveling characteristics so as to fill gaps resulting from application through a screen.

2. The screening paste of claim 1 wherein the vehicle composition is 0.5 to 3 weight percent hydroxylpropylcellulose, 97 to 99.5 weight percent 1,2- propanediol.

3. The screening paste of claim 1 wherein the liquid vehicle comprises about 10 to 30 weight percent of the paste.

4. The screening paste of claim 1 wherein the finely dispersed metal powder is a brazing alloy powder.

5. The screening paste of claim 1 wherein the finely dispersed metal powder is molybdenum and manganese.

6. The screening paste of claim 1 wherein the metal powder is finer than 325 mesh.

7. A liquid vehicle for a screening paste, the vehicle consisting essentially of 0.5 to 3 weight percent hydroxylpropylcellulose, 97 to 99.5 weight percent 1,2-propanediol, the vehicle having leveling characteristics suitable for screening.

8. The liquid vehicle of claim 1 containing, in addition, a wetting agent or dispersing agent.

* * * * *